July 11, 1961  M. R. JEPPSON  2,992,329
FLUID IRRADIATION
Filed May 12, 1958
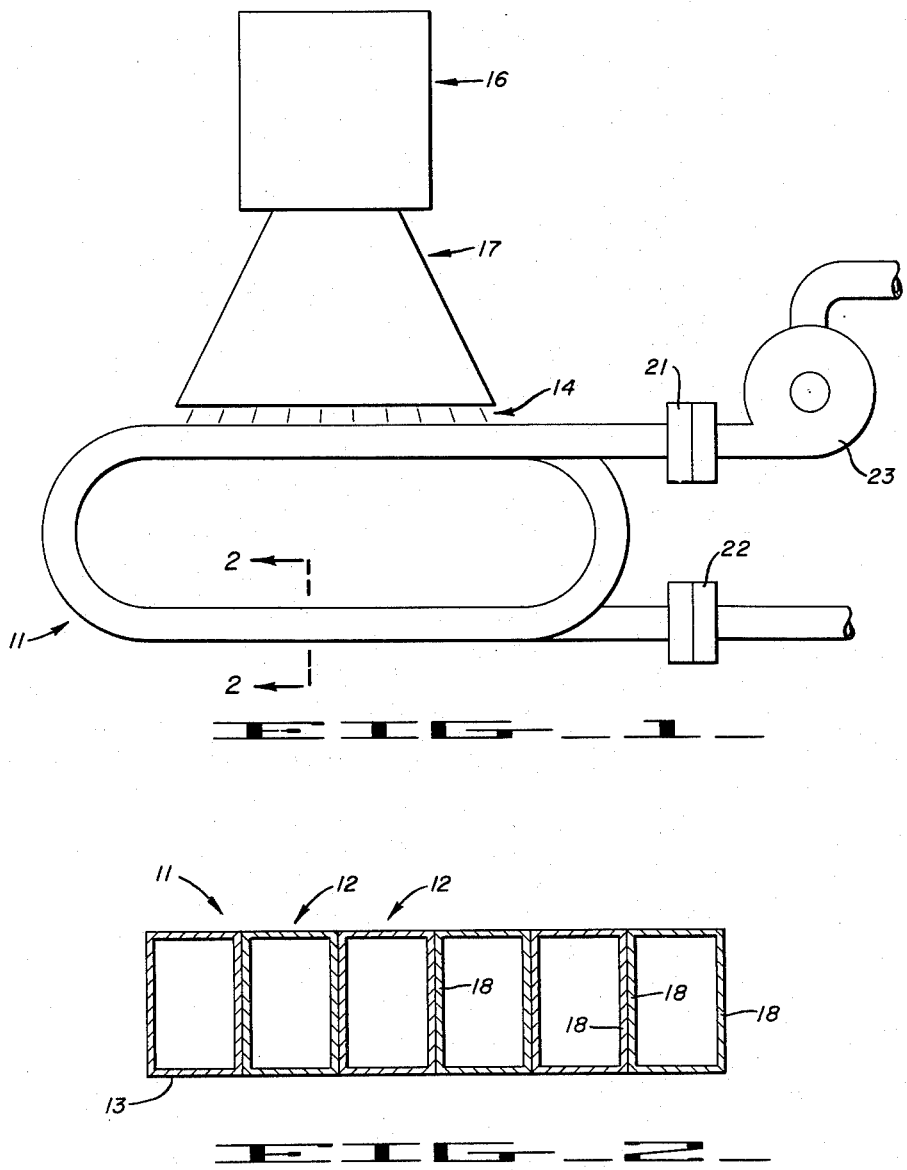
INVENTOR.
MORRIS R. JEPPSON
BY William D. Hager
ATTORNEY

United States Patent Office 2,992,329
Patented July 11, 1961

2,992,329
FLUID IRRADIATION
Morris R. Jeppson, Orinda, Calif., assignor to Applied Radiation Corporation, Walnut Creek, Calif., a corporation of California
Filed May 12, 1958, Ser. No. 734,522
1 Claim. (Cl. 250—48)

The present invention relates to an improved method of fluid irradiation and to an improved irradiation chamber for fluids.

Irradiation processes have found widespread utility and the applicability thereof is steadily increasing, as for example in the sterilization of foods. Foods and drugs can be sterilized in a few seconds by suitable irradiation thereof inasmuch as radiation penetration is almost instantaneous while more conventional sterilization techniques involve substantial time consumption. Contrasted to heat sterilization, for example, wherein thermal diffusion time must be reckoned with, irradiation sterilization provides a material saving in processing time.

While this rapidity of irradiation processing is highly advantageous it involves the problem of guarding against failure of the operation, for only a momentary fluctuation or interruption in the radiation results in a portion of the high speed process being uncompleted. Applying this again to a sterilization process, the foregoing would result in the passage of unsterilized material from the processing. This possibility cannot be tolerated in the food industry, for example, and even the small likelihood of failure that is yet present after incorporation of known safety and detection equipment would prevent use of irradiation sterilization under certain circumstances. As to these circumstances, it is apparent that in the processing of individual items such as canned goods or the like suitable checks may be provided to identify any untreated items so that same could be rejected and possibly reprocessed, however, in the irradiation of fluids wherein a flow thereof is to be processed any momentary irradiation interruption allows passage of untreated fluid that may mix with the remainder to spread contamination or the like and nullify the entire processing.

Inasmuch as practical irradiation processing may be advantageously accomplished with electron and X-ray irradiation produced by electrically powered equipment such as linear accelerators or the like it is evident that radiation beam interruption or fluctuation is quite possible so that the foregoing problem is a real and important one. Power supply fluctuations and interruptions or accelerator misfiring all result in radiation beam energy variations wholly unacceptable in fluid sterilization processes, for example.

The present invention provides a complete solution to the above-noted problem encountered in fluid flow irradiation processes and same is accomplished without adding to the complexity of the required processing system. The invention accomplishes the foregoing by increasing the time that fluid is exposed to irradiation while at the same time maintaining the same output or throughput and imposing no material restrictions upon the required irradiation energy. Viewed in another manner, the invention operates to provide simultaneous irradiation of two thicknesses of fluid spaced apart along the flow path so that only prolonged irradiation beam interruption can cause a failure in fluid irradiation.

It is an object of the present invention to provide an improved method of fluid irradiation.

It is another object of the present invention to provide an improved irradiation chamber wherein multiple irradiation is possible with a single beam.

It is another object of the present invention to provide a fluid flow system for irradiation processing having an elongated flow path in an irradiation volume substantially without reduction in the output of the system.

Other possible objects of the invention may be discerned from the following description and attached drawing, wherein:

FIGURE 1 is a side elevational view of an improved irradiation chamber and radiation source in accordance with the invention, and FIGURE 2 is a partial sectional view taken in the plane 2—2 of FIGURE 1.

In the following description the term "fluid" is taken as including liquids and flowable solids such as powders and slurries. Also in the following description the example of food sterilization is employed without intent to so limit the invention but only to clarify the description of operation of the invention.

Considering now the present invention as to a method of fluid irradiation, it is contemplated that a fluid flow shall be established through an irradiation zone whereat a beam of such as electrons or X-rays are directed to the end of imparting a predetermined radiation dosage to the fluid. This fluid flow is advantageously carried out at high rates inasmuch as radiation penetrates with almost the speed of light so as to sterilize food or drugs, for example, in some seconds or fractions of seconds. The irradiating beam defines a zone wherein fluids receive radiation and in order to prevent possible failure the irradiation process the fluid is caused to pass through this zone more than once. A fluid flow path is defined such that the fluid makes a plurality of traverses through the beam. Additionally, the fluid depth longitudinally of the beam is preferably substantially equal to but less than the "half thickness" of radiation in a single traverse thereof with two traverses. Further to the foregoing, the half thickness as herein employed is taken to mean the thickness of fluid in which one-half of the beam is absorbed or in which one-half of the beam energy is given up to the fluid. As is known in the art, irradiation dosage is not uniform with depth of penetration but instead a maximum dosage is imparted at some calculatable depth in the fluid for a particular beam energy. Through the operation of passing a half thickness of fluid through the beam a plurality of times and then returning same through the remainder of the beam a plurality of times the radiation effect of repeatedly passing a full thickness of fluid through the beam is attained with the advantage that momentary beam interruption affects only half thicknesses of spaced portions of the fluid whereby no single portion of the fluid passes without irradiation.

Further to the method of the invention is the provision of a smooth fluid flow path providing the least possible obstruction or resistance to the flow of fluid. As regards this flow path same is herein made to gently curve continuously through the irradiation zone so that maximum fluid irradiation is achieved while yet imposing a minimum resistance to flow.

In addition to providing for the fluid placement or flow path orientation in the above described manner to the end of maximizing the fluid irradiation time without retarding flow, is the further provision herein of insurng maximum beam utilization. In this respect the method contemplates the provision of at least two sheets of fluid made up of a plurality of adjacent flow paths and having a substantially constant thickness. By the provision of two fluid layers of constant predetermined thickness it is possible to fully utilize all of the irradiating beam, for all of the beam is intercepted by a like amount of fluid and no thin spots are present through which parts of the beam may pass without giving up energy.

In summary of the above described method of fluid irradiation the steps thereof include the direction of a beam of radiation through an irradiation zone and passing fluid through said zone in a plurality of adjacent traverses with minimum flow resistance in two layers with each layer having a thickness in the direction of beam travel which is substantially equal to the radiation half-thickness, i.e., depth of material in which one-half of the beam energy is dissipated.

As to the novel fluid irradiation means or chamber of the present invention, reference is made to the drawings wherein there is shown a coil 11 formed as a plurality of contiguous turns 12 of tubing 13. The coil is disposed to receive radially thereof an irradiating beam 14, formed for example of high energy electrons, and a radiation source 16 such as a linear electron accelerator produces the beam. Inasmuch as radiation sources of this type generally provide a focused beam of limited cross section means 17 are provided to effectuate irradiation of substantially all of the coil 11. This is readily accomplished either by scanning the beam rapidly over the coil in some overall pattern or defocusing the beam to increase the cross section thereof as desired. Loss of beam energy may be limited by the provision of an evacuated cone extending close to the coil and wherein lateral beam displacement is effected.

Considering further the coil 11, the tubing 13 forming same has a rectangular cross section, as shown in FIGURE 2, with thin walls 18 in order to minimize beam losses therein. The coil turns 12 are disposed contiguously and may be flattened, as illustrated, to reduce the distance of beam traverse between opposite sides thereof for minimizing beam losses in the intervening space. At opposite ends of the coil lateral tube extensions form inlet and outlet passages 21 and 22 respectively and a fluid pump 23 may be connected at one of the ports for forcing high velocity fluid flow through the coil. Suitable reservoirs or the like, not shown, may be connected to opposite ends of the coil 11 for providing fluid to be irradiated and receiving irradiated fluid.

The coil tubing 13 has for optimum results a thickness substantially equal to the irradiation half thickness, as above defined, so that substantially one-half of the irradiation effects are produced in the side of the coil adjacent the beam source and one-half in the opposite coil side. Owing to the gently curving nature of the tubing 13 fluid passing therethrough encounters a minimum of flow resistance and the "through-put" of the device is not substantially different from that of a straight fluid conduit.

While the salient features of this invention have been described in detail with respect to certain embodiments thereof, it will of course be apparent that certain modifications may be made within the spirit and scope of this invention, and it is not desired therefore to limit the inventon to the exact details shown except insofar as they may be defined in the following claim.

What is claimed is:

Apparatus for fluid irradiation comprising means for producing a beam of invisible penetrating radiation, a coil of contiguous turns of thin-walled tubing of rectangular cross-section with the coil flattened into a biplanar configuration of closely spaced planes connected by smoothly curving sections for minimum flow resistance therein, said coil having fluid flowing therethrough and disposed with the coil planes spaced from said means in the direction of beam traverse and normal thereto with the width across said tubing radially of the coil being less than a thickness of said fluid absorbent of one-half of the incident beam energy.

References Cited in the file of this patent

UNITED STATES PATENTS

| 1,981,583 | Craig | Nov. 20, 1934 |
| 2,248,618 | Fischer | July 8, 1941 |
| 2,480,198 | Rogers | Aug. 30, 1949 |
| 2,648,774 | Whitlock | Aug. 11, 1953 |
| 2,729,748 | Robinson | Jan. 3, 1956 |

FOREIGN PATENTS

| 324,503 | Great Britain | Jan. 30, 1930 |